United States Patent [19]

Kekish et al.

[11] 4,421,791

[45] Dec. 20, 1983

[54] SIDE RELEASE AGENT FOR COAL CARS

[75] Inventors: George T. Kekish, Naperville; Carol B. Batton, Bartlett, both of Ill.

[73] Assignee: Nalco Chemical Company, Oak Brook, Ill.

[21] Appl. No.: 324,767

[22] Filed: Nov. 25, 1981

[51] Int. Cl.³ .................. B05D 7/22; C09K 3/18; C09K 5/00; C08L 91/00
[52] U.S. Cl. .................. 427/239; 106/243; 106/13; 252/70
[58] Field of Search .............. 106/243, 244, 13; 252/32.5, 70; 427/236, 239; 428/457

[56] References Cited

U.S. PATENT DOCUMENTS

| 2,956,890 | 10/1960 | Casteras | 106/38.22 |
| 4,073,412 | 2/1978 | Doumani | 106/244 |
| 4,312,901 | 1/1982 | Kekish | 106/13 |

OTHER PUBLICATIONS

Chemical Abstract 62:2658b, Societe d'Etudes d'Applications Industrielles.

Primary Examiner—Theodore Morris
Attorney, Agent, or Firm—John S. Fosse

[57] ABSTRACT

An anti-stick agent for use in preventing coal and other particulate products from freezing to contacted metal surfaces comprises a liquid hydrocarbon vehicle and at least about five percent by weight of a naturally occurring phospholipid substance such as lecithin.

6 Claims, No Drawings

SIDE RELEASE AGENT FOR COAL CARS

FIELD OF THE INVENTION

This invention relates generally to the commercial transportation of macroparticulate products, such as crushed coal or crushed limestone, and more particularly to means for preventing quantities of such bulk products from freezing to the walls of railroad hopper or gondola cars. In one specific aspect, the present invention relates to chemical agents for use in reducing the force necessary to unload coal that has been frozen in an open-top railroad car.

BACKGROUND OF THE INVENTION

Coarse particles of such bulk products as coal, pelletized iron ore and limestone ordinarily carry quantities of introduced, surface moisture. For example, water sprays are commonly employed in mine crushing operations to minimize the quantity of dust or fines that is discharged into the atmosphere, and a certain amount of this moisture is picked up by the product being processed. Coal is also sometimes stored underwater to avoid both weathering and spontaneous combustion. Furthermore, atmospheric precipitation introduces moisture into products which have been stored in the open or shipped in open-top conveyances. Regardless of the source, surface moisture much in excess of about five percent can create serious problems when particulate products are transported in bulk during sub-freezing weather. Railroad demurrage charges encourage immediate unloading of freight cars and have prompted the application of vibratory and impact forces, thawing with blow torches and even resort, in extreme cases, to blasting in order to loosen and discharge solidly frozen bulk cargo.

Another aspect of the problem, particularly with references to the freezing of coal, involves the fraction of the cargo that has adhered specifically to the sides and bottom of the rail car. It has been observed in the field that coal freezing to the side walls and bottoms of the rail cars presents a severe problem. Often, the length of transit and the ambient temperature are such that the interior coal does not freeze; and as a result moisture can migrate from the warm interior to the cold rail car walls. This moisture contributes to the freezing which occurs on the walls and bottoms of the car. Also, in most instances, the loaded coal maintains a higher concentration of large particles nearer the walls. Because these large particles have less surface area to accommodate the surface moisture, aggrevation of the freezing occurs.

In the past, release agents comprising a light petroleum oil or a mixture of water and various glycols, with and without surfactants and other additives, have been sprayed or mopped onto the interior walls of empty railroad hopper cars, and sometimes mixed with the cargo itself, in an effort to reduce the compressive force necessary to dislodge a load of subsequently frozen coal or the like. However, it has been found that these prior art compositions quickly wear off or wash off the treated surfaces and thus are neither reliable nor economical.

SUMMARY OF THE INVENTION

The present invention overcomes the limitations of the prior art by providing a treatment for the interior wall surfaces of railroad hopper cars and the like that is characterized by its persistence and by its extended ability to reduce the compressive force required to break free a carload of frozen macroparticulate product. In order to accomplish these results, the present invention contemplates the addition of an inexpensive, naturally occurring phospholipid emulsifier, in particular a lecithin composition, to a light petroleum oil, such as No. 2 Fuel Oil or White Mineral Oil, in an amount of about fifteen percent by weight. The resulting formulation can be sprayed or mopped onto hopper car sidewalls, for example, where its oil phase plates out on the metal surfaces, displacing any water or ice that is present, and forms an adherent film which minimizes frozen attachment of the freight car contents.

Accordingly, a general object of the present invention is to provide a new and improved composition for preventing moisture-entraining coal and other macroparticulate products from freezing to contacted metal walls of outdoor storage bins and carriers.

Another object of the invention is to provide a composition for the described purpose which is characterized by its persistent effectiveness.

Still another object of the invention is to provide an improved method of reducing the freeze-adherence of coarse mineral particles to the metal surfaces of shipping containers and the like.

These and other objects and features of the invention will become more apparent from the following descriptions and examples.

DETAILED DESCRIPTION OF THE INVENTION

In accordance with the method aspects of the present invention, a naturally occurring substance comprising phospholipids (phosphatides) is dispersed in a liquid hydrocarbon vehicle; and the resulting mixture is sprayed, mopped or otherwise applied to appropriate surfaces in order to prevent coal or other particulate products from freezing in a shipping or storage container. The anti-stick agent of the invention is advantageously applied to the metal walls of railroad hopper or gondola cars, highway trucks or surge bins, and even can be applied to the particulate product itself, although the former is preferred. The surface to which the instant antistick agent is applied is desirably dried in advance of the application, although the compositions of the invention are effective even when applied on wet or icy surfaces. It is believed that the instant compositions act by uptake of any water displayed on the wet or frozen surfaces of metal walls and on cargo particles adjacent such walls and by plating out the oil phase with resultant displacement and repulsion of water or ice. It is also believed that the phosphorus moiety of the phospholipid material attaches to the rust ubiquitously found in railroad hopper cars to lend permanence to the instant coatings.

In accordance with the principles of the present invention, the naturally occurring phospholipid substance utilized in the instant compositions comprises the mixture known commercially and popularly as "lecithin"; and the principal components of this mixture are chemical lecithin (phosphatidyl choline), cephalin (phosphatidyl ethanolamine), inositol phosphatides (phosphoinositides) and related phosphorus-containing lipids. Accordingly, the principal phospholipids of the invention have the structural formula:

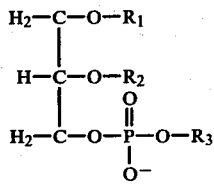

wherein $R_1$ and $R_2$ are fatty acyl radicals containing from 8 to 18 carbon atoms and wherein $R_3$ is selected from:

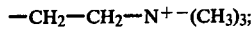     (A)

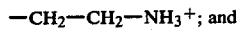     (B)

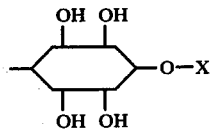     (C)

wherein X is one or more phosphate groups linked to one or more sugar molecules.

Useful phospholipids occur naturally in both animal and vegetable products such as egg yolk, seeds and nuts, although the major source of commercial lecithin is the soybean. The lecithins of commerce are neutral fats in which one fatty acid radical has been replaced by a phosphoric acid-nitrogenous base group. The lecithins are effective emulsifiers in a wide range of pH environments because of their amphoteric character. On the acid side, these materials act like cationic surfactants; and on the alkaline side, they act as anionics. For purposes of the present invention, the naturally occurring phospholipids differ from synthetic amphoteric surfactants, such as the fatty acid amides and synthetically phosphated mono- and di-glycerides, in that they exhibit unusual spreading characteristics and achieve a high degree of permanence of the oil film that is plated out upon application in the practice of the invention.

Numerous light hydrocarbon or petroleum oils may be usefully employed as the vehicle and the major oil phase constituent of the instant compositions; and such products as Kerosene, Liquid Petrolatum, White Mineral Oil, and both #1 and #2 Fuel Oils have been conveniently utilized because of low cost and ready availability. White Mineral Oil is preferred in the practice of the invention because of its low toxicity and its low "fireball" hazard on ignition, White Mineral Oil having a flash point of about 430° F. as compared with #2 Fuel Oil which has a flash point of about 150° F.

Because the naturally occurring phospholipids are strongly hygroscopic, the instant compositions are preferably applied directly from sealed containers or freshly mixed on site from phospholipid material which has been kept in closed containers until used.

In order to describe the invention more fully, the following specific examples are given without, however, limiting the invention to the precise details and conditions set forth except as required by the appended claims.

EXAMPLES 1 AND 2

Two separate products were formulated in accordance with the present invention by simple mechanical mixing of the respective ingredients, measured on a weight basis, as follows:

FORMULA #1

85%—White Mineral Oil ("Blandol" sold by Witco Chemical Corporation
15%—Premium Natural Fluid Lecithin ("Actiflo 68 - UB" sold by Central Soya Company, Inc.)

FORMULA #2

85%—#2 Fuel Oil
15%—Premium Natural Fluid Lecithin

In order to elucidate the effectiveness of these two formulations for reducing the freeze-adherence of coarse mineral particles to the metal surfaces of shipping containers, quantities of a single grade of crushed, screened (minus ½-inch mesh) coal were packed into short sections of mild steel tubing (2½-inch I.D. ×3¾-inch) which had been previously wiped dry with paper toweling. The moisture content of the coal was determined in advance to be 6.8 percent by weight. The dry cylinders were then flooded interiorly, as by spraying, with the selected agent; and before being loaded with coal, the test cylinders were totally submerged in agitated water for one minute in order to wet them thoroughly. The cylinders were then drained, uniformly packed with coal and immediately frozen overnight for 18 hours at 0° F. (−17.8° C.).

After having been subjected to freezing temperatures, the cylinders were removed from the cold cabinet and immediately tested for the shear force needed to discharge the coal, a calibrated ram or piston being used for this purpose. The variables used in this study and the results of the initial examination are set forth in the first two columns of Table One below, where it will be noted that all the treatments exhibit effectiveness in reducing the required release force. However, Formula #2 is clearly demonstrated to be superior by a factor of about 40 percent.

After this first test, the cylinders were not washed or cleaned or re-treated with the anti-stick agent. Rather, they were thawed, submerged again in water and wetted for one minute, repacked with coal and again frozen overnight at 0° F. Release forces were then determined; and this procedure was repeated several times in order to determine the effectiveness of the various agents after a single application. The results are set forth in the final columns in Table One where it will be noted that the compositions of the present invention proved to be 15–50 percent more effective than the best commercial product tested after the fourth run and without renewal of the treatment. Both of the formulations of the present invention also proved to be four to six times more effective than fuel oil alone after the fourth run.

TABLE ONE

| | COAL TEST CYLINDER RELEASE FORCES AFTER FREEZING (Shear Strength in lbs./ft.²) | | | | | | | |
|---|---|---|---|---|---|---|---|---|
| | Initial (Dry Cylinder) | | First Repetition | | Second Repetition | | Third Repetition | |
| Surface Treatment | Shear Strength | Reduction | Shear Strength | Reduction | Shear Strength | Reduction | Shear Strength | Reduction |
| None | 1755.5 ± 435.2 | — | 2700.0 ± 268.9 | — | 2122.2 ± 420.5 | — | 2132.0 ± 268.9 | — |
| Formula #1 | 704.2 ± 152.0 | 59.9% | 757.9 ± 30.8 | 71.9% | 699.3 ± 121.2 | 67.0% | 1291.0 ± 405.9 | 39.4% |

TABLE ONE-continued
COAL TEST CYLINDER RELEASE FORCES AFTER FREEZING
(Shear Strength in lbs./ft.$^2$)

| Surface Treatment | Initial (Dry Cylinder) Shear Strength | Reduction | First Repetition Shear Strength | Reduction | Second Repetition Shear Strength | Reduction | Third Repetition Shear Strength | Reduction |
|---|---|---|---|---|---|---|---|---|
| Formula #2 | 513.4 ± 152.0 | 70.7 | 968.2 ± 165.2 | 64.2 | 929.1 ± 55.1 | 56.2 | 1555.0 ± 96.9 | 27.1 |
| Commercial Product A* | 811.7 ± 107.9 | 53.8 | 1491.4 ± 143.2 | 44.8 | 1207.8 ± 90.3 | 43.1 | 1633.2 ± 533.0 | 23.4 |
| Commercial Product B** | 733.5 ± 283.6 | 58.2 | 1154.0 ± 361.8 | 57.3 | 1403.4 ± 611.2 | 33.9 | 2068.4 ± 239.6 | 3.0 |
| #2 Fuel Oil | — | — | 982.9 ± 459.7 | 63.6 | 924.2 ± 244.5 | 56.5 | 1985.3 ± 542.7 | 6.9 |

*A mixture of fuel oil and surfactant.
**A mixture of light hydrocarbon oil and an organic phosphorus compound.

A series of tests was also conducted in which the test cylinders were pre-wet before application of the release agent. After coating the pre-wet cylinders with the selected agent, the units were again submerged in agitated water for one minute, packed tightly with coal and frozen overnight for 18 hours at 0° F. The data from this testing is set forth in Table Two below where it will be apparent that the formulations of the present invention are apparently as effective as they were when applied to dry metal surfaces.

TABLE TWO
PRE-WET CYLINDER RELEASE FORCES AFTER FREEZING
(Shear Strength in lbs./ft.$^2$)

| Surface Treatment | Shear Strength | Reduction % |
|---|---|---|
| None | 2039.1 ± 508.5 | — |
| Commercial Product A | 978.0 ± 61.7 | 52.0 |
| Formula #1 | 709.0 ± 103.5 | 65.2 |
| Formula #2 | 816.6 ± 143.2 | 60.0 |
| Commercial Product C* | 1907.1 ± 611.2 | 6.5 |

*A mixture of ethylene glycol, diethylene glycol and propylene glycol

Coal and iron ore products with varying water content were tested in like manner using the composition of Formula #1; and the results which are shown in Table Three below indicate the general and widespread effectiveness of this treatment for reducing the freeze adherence to metal surfaces.

TABLE THREE

| Sample | Water Content | Reduction in Side Release Shear Strength |
|---|---|---|
| IOC - Raw Iron Ore | 1.2% | 76.1% |
| IOC - Iron Ore Conc. | 5.4% | 19.1% |
| Henry Clay Coal | 5.5 ± 2.0% | 62.4% |
| Middle States Coal | 9.8% | 72.1% |
| Detroit Edison Coal | 10.0% | 78.7% |
| Georgia Power Coal | 12.2% | 71.3% |
| Chapperal Coal | 12.5% | 75.9% |
| Georgia Power Coal | 13.6% | 73.4% |
| Northern States Power-Coal | 19.1% | 70.7% |

The specific examples herein shown and described are to be considered as being primarily illustrative. Various changes will, no doubt, occur to those skilled in the art; and such variations are to be understood as forming a part of this invention in so far as they fall within the spirit and scope of the appended claims.

The invention is claimed as follows:

1. The method of reducing the freeze-adherence of coarse mineral particles to the metal surfaces of shipping containers, which method comprises the steps of applying to said surfaces a coating mixture of a naturally occurring phospholipid substance dispersed in a hydrocarbon liquid, in which the principal phospholipids have the structural formula:

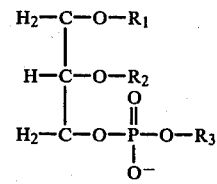

wherein $R_1$ and $R_2$ are fatty acyl radicals containing from 8 to 18 carbon atoms and wherein $R_3$ is selected from:

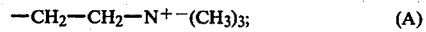

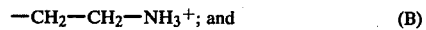

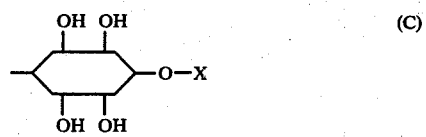

wherein X is one or more phosphate groups linked to one or more sugar molecules and subsequently adding coarse mineral particles to the container.

2. The method according to claim 1 wherein said phospholipid substance is present in an amount of from about 5 to about 25% by weight of said vehicle.

3. The method according to claim 1 wherein said vehicle is a petroleum liquid.

4. The method according to claim 3 wherein said petroleum liquid is #2 Fuel Oil.

5. The method according to claim 3 wherein said petroleum liquid is White Mineral Oil.

6. The method according to claim 1 wherein both $R_1$ and $R_2$ contain from 16 to 18 carbon atoms.

* * * * *